US012382015B2

United States Patent
Tsai et al.

(10) Patent No.: US 12,382,015 B2
(45) Date of Patent: Aug. 5, 2025

(54) METHOD AND APPARATUS OF ENCODING OR DECODING WITH MODE DEPENDENT INTRA SMOOTHING FILTER IN INTRA PREDICTION

(71) Applicant: MEDIATEK INC., Hsinchu (TW)

(72) Inventors: Chia-Ming Tsai, Hsinchu (TW); Chih-Wei Hsu, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 514 days.

(21) Appl. No.: 17/605,126

(22) PCT Filed: Apr. 22, 2020

(86) PCT No.: PCT/CN2020/086170
§ 371 (c)(1),
(2) Date: Oct. 20, 2021

(87) PCT Pub. No.: WO2020/216255
PCT Pub. Date: Oct. 29, 2020

(65) Prior Publication Data
US 2022/0201286 A1    Jun. 23, 2022

Related U.S. Application Data

(60) Provisional application No. 62/862,202, filed on Jun. 17, 2019, provisional application No. 62/851,136, (Continued)

(51) Int. Cl.
*H04N 19/593* (2014.01)
*H04N 19/105* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/82* (2014.11)

(58) Field of Classification Search
CPC .. H04N 19/105; H04N 19/132; H04N 19/159; H04N 19/176; H04N 19/82; H04N 19/593; H04N 19/117
See application file for complete search history.

(56) References Cited

U.S. PATENT DOCUMENTS 9,179,148 B2    11/2015    Li et al.
10,200,719 B2 *    2/2019    Zhang ................... G06F 17/147
(Continued)

FOREIGN PATENT DOCUMENTS

CN    104041051 A    9/2014
CN    109314782 A    2/2019
(Continued)

OTHER PUBLICATIONS

Benjamin Bross, VVC Draft 5 (Year: 2019).*
(Continued)

*Primary Examiner* — Philip P. Dang
(74) *Attorney, Agent, or Firm* — McClure, Qualey & Rodack, LLP (57) ABSTRACT

A video processing method for a video encoder or decoder comprises receiving input data of a current block, determining an intra prediction mode and reference samples according to the intra prediction mode, determining an intra reference sample filter from a Gaussian interpolation filter and an alternative interpolation filter for the current block, applying the intra reference sample filter to the reference samples to generate an intra predictor for the current block, and encoding or decoding the current block based on the intra predictor. A determination between the Gaussian and (Continued)

alternative interpolation filters is depending on a comparison of a mode difference value calculated by the intra prediction mode with a size-dependent threshold. The size-dependent threshold is set to be equal to 24 for blocks with block size smaller than or equal to 32 samples according to an embodiment. The alternative interpolation filter may be a DCT-IF interpolation filter.

17 Claims, 9 Drawing Sheets

Related U.S. Application Data filed on May 22, 2019, provisional application No. 62/838,392, filed on Apr. 25, 2019.

(51) Int. Cl.
*H04N 19/117* (2014.01)
*H04N 19/132* (2014.01)
*H04N 19/159* (2014.01)
*H04N 19/176* (2014.01)
*H04N 19/82* (2014.01)

(56) References Cited

U.S. PATENT DOCUMENTS

| | | | | |
|---|---|---|---|---|
| 10,284,866 | B1* | 5/2019 | Zhao | H04N 19/159 |
| 10,419,757 | B2* | 9/2019 | Chen | H04N 19/182 |
| 10,469,845 | B1* | 11/2019 | Zhao | H04N 19/176 |
| 10,491,893 | B1* | 11/2019 | Zhao | H04N 19/11 |
| 10,645,416 | B2* | 5/2020 | Min | H04N 19/11 |
| 10,652,575 | B2* | 5/2020 | Zhang | H04N 19/157 |
| 10,750,172 | B2* | 8/2020 | Vanam | H04N 19/117 |
| 10,757,407 | B2 | 8/2020 | Yoo et al. | |
| 10,771,782 | B2* | 9/2020 | Zhao | H04N 19/91 |
| 10,834,393 | B2* | 11/2020 | Zhao | G06T 5/20 |
| 10,841,593 | B2* | 11/2020 | Zhao | H04N 19/136 |
| 10,951,884 | B2* | 3/2021 | Moon | H04N 19/573 |
| 11,044,467 | B2* | 6/2021 | Lainema | H04N 19/11 |
| 11,051,021 | B2* | 6/2021 | Aono | H04N 19/117 |
| 11,196,998 | B2* | 12/2021 | Onno | H04N 19/186 |
| 11,284,108 | B2* | 3/2022 | Ko | H04N 19/593 |
| 11,310,517 | B2* | 4/2022 | Jun | H04N 19/122 |
| 11,418,816 | B2* | 8/2022 | Hanhart | H04N 19/186 |
| 11,457,198 | B2* | 9/2022 | Hanhart | H04N 19/186 |
| 11,463,689 | B2* | 10/2022 | Zhao | H04N 19/11 |
| 11,689,722 | B2* | 6/2023 | Bossen | H04N 19/172 |
| | | | | 375/240.03 |
| 2012/0183041 | A1* | 7/2012 | Maani | H04N 19/11 |
| | | | | 375/E7.126 |
| 2013/0121401 | A1 | 5/2013 | Zheludkov et al. | |
| 2016/0373742 | A1* | 12/2016 | Zhao | H04N 19/136 |
| 2016/0373770 | A1* | 12/2016 | Zhao | H04N 19/593 |
| 2016/0373782 | A1* | 12/2016 | Zhao | H04N 19/91 |
| 2019/0208198 | A1* | 7/2019 | Pettersson | H04N 19/159 |
| 2019/0306516 | A1 | 10/2019 | Misra et al. | |
| 2020/0366900 | A1* | 11/2020 | Jun | H04N 19/176 |

FOREIGN PATENT DOCUMENTS

| | | |
|---|---|---|
| TW | 201717626 A | 5/2017 |
| WO | 2018/221817 A1 | 12/2018 |

OTHER PUBLICATIONS

Shohei Matsuo, Improved Intra Angular Prediction By DCT-Based Interpolation Filter, European Signal Processing Conference (EUSIPCO 2012) Bucharest, Romania, Aug. 27-31, 2012 (Year: 2012).*
Geert Van der Auwera, JV ET-L0324- v2, Oct. 3-12, 2018 (Year: 2018).*
Tsai, C., et al.; "CE3-related: Simplification and unification for intra reference sample filtering_v4_Spec Test 2" (retrieved on Jun. 25, 2019).
Bross, B.; et al.; "Versatile Video Coding (Draft 5)" (retrieved on Apr. 12, 2019).
Van Der Auwera, G., et al.; "CE3: Intra reference sample interpolation filer selection using MDIS conditions (Test 3.1.2)" (retrieved on Oct. 2, 2018).
International Search Report and Written Opinion dated Jul. 20, 2020, issued in application No. PCT/CN2020/086170.
Filippov, A., et al.; "Non-CE3: Extended Mode-Dependent Intra Smoothing;" Joint Video Experts Team (JVET) of ITU-T SG 16 WP 3 and ISO/IEC JTC 1/SC 29/WG 11; Jan. 2019; pp. 1-4.
Filippov, A., et al.; "CE3: A combination of tests 3.1.2 and 3.1.4 for intra reference sample interpolation filter;" Joint Video Experts Team (JVET) of ITU-T SG 16 WP 3 and ISO/IEC JTC 1/SC 29/WG 11; Oct. 2018; pp. 1-5.
Chinese language office action dated Jun. 21, 2021, issued in application No. TW 109113769.
Tsai, C., et al.; "CE3-related: Simplification and unification for intra reference sample filtering_v1" (retrieved on Jun. 25, 2019).
Tsai, C., et al.; "CE3-related: Simplification and unification for intra reference sample filtering_v4 _Spec Test2" (retrieved on Jul. 5, 2019).
Tsai, C., et al.; "CE3-related: Simplification and unification for intra reference sample filtering_v5_Presentation" (retrieved on Jul. 5, 2019).
Lee, J., et al.; "CE3: Intra reference sample interpolation (Test 3.1.3)" (retrieved on Sep. 24, 2018).
Filippov. A., et al.; "CE3-related: Interpolation filtering for intra-prediction within rectangular blocks" (published on Jul. 12, 2018).
Van Der Auwera, G., et al.; "CE3: Intra reference sample interpolation filter selection using MDIS conditions (Test 3.1.2)" (retrieved on Oct. 2, 2018).
Matsuo, S., et al.; "Improved intra angular prediction by DCT-based interpolation filter" (published on Aug. 31, 2012).
EP Search Report dated Nov. 23, 2022 in European Application No. 20794000.8-1208/PCT/CN2020086170.
Bross et al., JVET-N1001-v8.docx, Versatile Video Coding (Draft 5), pp. 1 and 148-149 are included, the entire document accessible via link https://jvet-experts.org/doc_end_user/current_document.php?id=6640 and selection of JVET-N1001, version 8 dated Jun. 11, 2019.

\* cited by examiner

METHOD AND APPARATUS OF ENCODING OR DECODING WITH MODE DEPENDENT INTRA SMOOTHING FILTER IN INTRA PREDICTION

CROSS REFERENCE TO RELATED APPLICATIONS

The present invention claims priority to U.S. Provisional Patent Application Ser. No. 62/838,392, filed on Apr. 25, 2019, entitled "Simplification of Mode Dependent Intra Smoothing and Position Dependent Intra Prediction Combination", U.S. Provisional Patent Application Ser. No. 62/851,136, filed on May 22, 2019, entitled "Simplification of Mode Dependent Intra Smoothing Conditions", and U.S. Provisional Patent Application Ser. No. 62/862,202, filed on Jun. 17, 2019, entitled "Simplification of Mode Dependent Intra Smoothing Conditions". The above U.S. Provisional Patent Applications are hereby incorporated by reference in their entireties.

FIELD OF THE INVENTION

The present invention relates to encoding or decoding video data by referencing neighboring samples in a same video picture. In particular, the present invention relates to encoding and decoding video data with intra predictor derived with a mode dependent intra smoothing filter.

BACKGROUND AND RELATED ART

Intra prediction has been widely adopted in various image and video coding standard to process an initial picture or to periodically insert I-picture or I-blocks for random access or for alleviation of error propagation. Intra prediction is designed to exploit spatial features in the picture such as smooth area, vertical line or edge, horizontal line or edge, and diagonal line or edge within a picture or within a picture region. Intra prediction is also useful for regions with high motion or scene changes. For a block-based video coding standard, intra prediction for a current block is relied upon samples in neighboring blocks that have been processed. For example, if blocks in a video picture or picture region are sequentially processed row by row from top to bottom and from left to right, neighboring blocks on the top and neighboring blocks on the left of the current block can be used to form an intra predictor for predicting samples in the current block.

Figure 1:
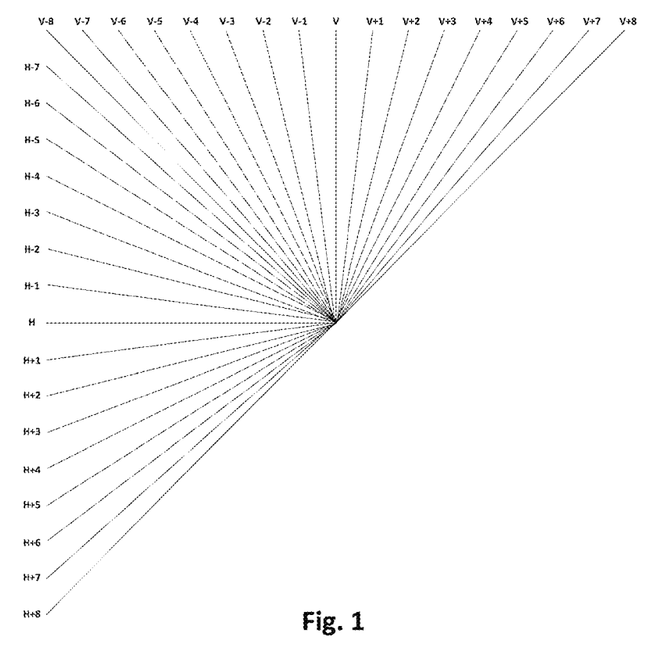
FIG. 1 illustrates 33 angular intra prediction modes supported in the HEVC standard.
Figure 2:
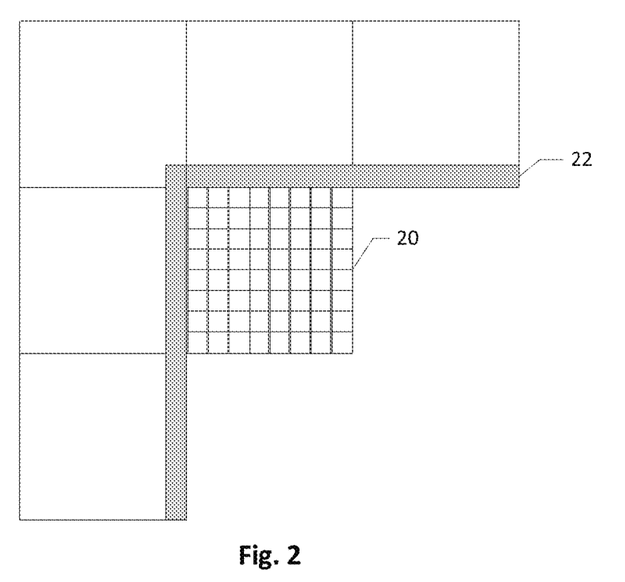
FIG. 2 illustrates exemplary reference samples filtered by an intra smoothing filter for deriving an intra predictor for a current block.

The High-Efficiency Video Coding (HEVC) standard supports 35 intra prediction modes including 33 angular modes, DC mode, and Planar mode. FIG. 1 illustrates the prediction directions for the 33 angular intra prediction modes supported in the HEVC standard, where H represents Horizontal direction mode and V represents Vertical direction mode. An intra predictor for a current block coded or to be coded by intra prediction of HEVC is generated by three steps including intra smoothing filter, intra prediction and intra gradient filter. FIG. 2 illustrates exemplary reference samples filtered by an intra smoothing filter for deriving an intra predictor for a current block. A smoothing operation is applied to reference samples 22 of the current block 20 as a pre-processing step before calculating the intra predictor for the current block 20. The smoothing operation corresponds to applying a Finite Impulse Response (FIR) intra smoothing filter, [1 2 1]>>2, with low-pass characteristics to the reference samples 22 belonging to a left neighboring column and an above neighboring row of the current block 20. The smoothing operation reduces the discontinuities introduced by some of the intra prediction modes by applying the FIR filter. This smoothing operation is adaptively applied depending on an intra prediction mode and the size of the current block.

The second step of intra prediction is to derive the intra predictor from neighboring reference samples according to one intra prediction mode selected from the 35 intra prediction modes. The intra prediction mode is decided by the encoder and signaled in the bitstream so the corresponding decoder may parse the intra prediction mode from the bitstream. The value of each sample in the current block is predicted by extrapolating the samples from the reference samples according to the prediction direction of the selected angular mode when an angular mode is selected. The value of each sample in the current block is calculated assuming an amplitude surface with a horizontal and vertical smooth gradient derived from the boundaries samples of the neighboring blocks when Planar mode is selected. The value of each samples of the current block is an average of the reference samples when DC mode is selected.

Figure 3A:
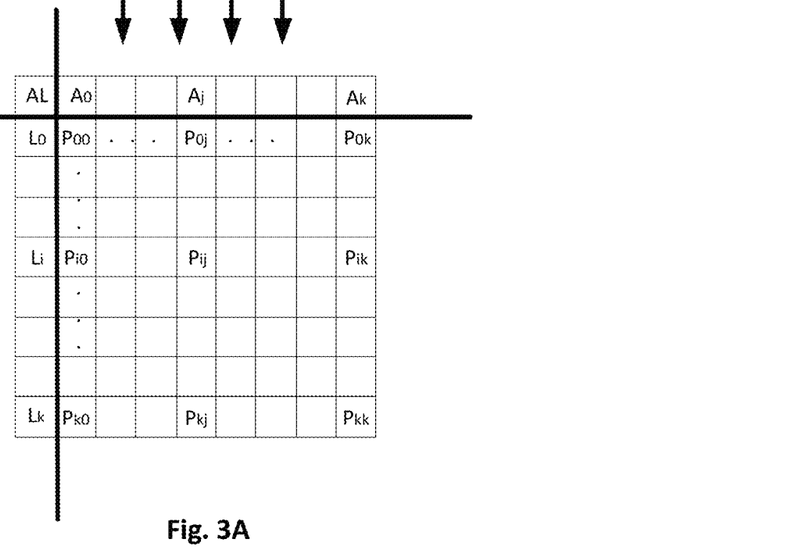
FIG. 3A illustrates applying an intra gradient filtering to a predictor predicted by Vertical mode in intra prediction.
Figure 3B:
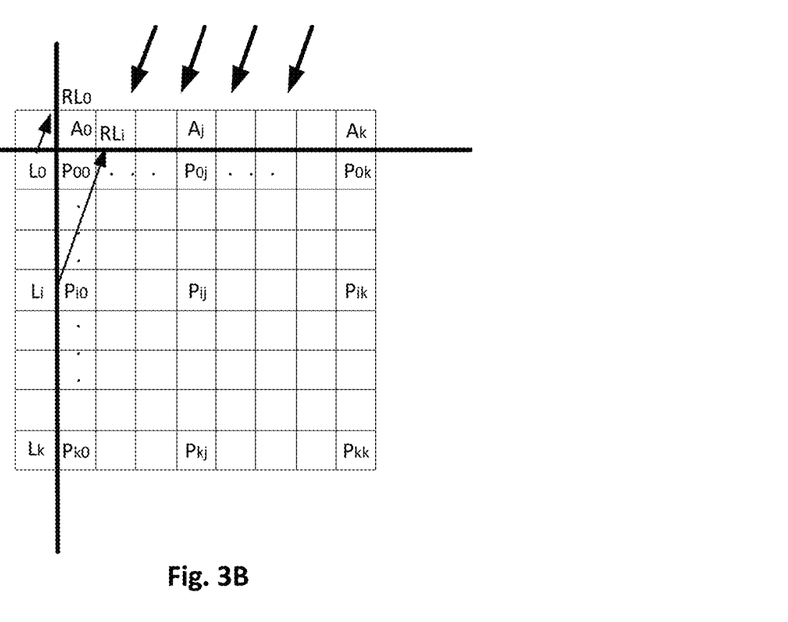
FIG. 3B illustrates applying an intra gradient filtering to a predictor predicted by an angular mode in intra prediction.

An intra gradient filter is applied to samples at the left and top boundaries of the current block in the third step. The concept of applying the intra gradient filter is to utilize the gradient information along the intra prediction direction to improve the quality of intra prediction. FIG. 3A illustrates applying an intra gradient filtering to a predictor predicted by Vertical mode or Horizontal mode. In FIG. 3A, a predicted pixel Pij denotes the predictor at row i and column j, and AL represents a reconstructed sample at the left-above corner of the current block while Li represents a reconstructed sample in the left neighboring column of the current block. A final predicted pixel P'ij for each predicted pixel Pij is calculated by Equation (1) after applying the intra gradient filter.

$$P'ij = Pij + \alpha \cdot (Li - AL) \quad \text{Equation (1)}$$

where $\alpha$ is a fraction from 0 to 1 and is selected according to the horizontal displacement j, for example, $\alpha = \frac{1}{2}$ when j=0, and $\alpha = \frac{1}{4}$ when j=1. As for a current block predicted by Horizontal mode, a final predicted pixel P'ij for each predicted pixel Pij is calculated by Equation (2).

$$P'ij = Pij + \alpha \cdot (Aj - AL) \quad \text{Equation (2)}$$

where Aj is a reconstructed sample in the above row. As for the directional modes v+1~v+8 and h+1~h+8, a corresponding reference sample RLi or RAj of the reconstructed sample Li or Aj is first obtained along the direction of intra prediction to replace the reconstructed sample Li or Aj. Interpolation of integer pixels in the above row or the left column of the current block is applied to generate the corresponding reference sample RLi or RAj when it is not located at the position of an integer pixel. FIG. 3B illustrates examples of applying the intra gradient filter for v+1~v+8 directional modes. A final predicted pixel P'ij is calculated from each predicted pixel Pij according to Equation (3).

$$P'ij = Pij + \alpha \cdot (Li - RLi) \quad \text{Equation (3)}$$

Similar to Vertical mode, $\alpha$ is a fraction from 0 to 1 and is selected according to the direction of intra prediction and the horizontal displacement j. As for h+1~h+8 directional modes, the final predicted pixel P'ij is calculated from each predicted pixel Pij according to Equation (4), where $\alpha$ is a fraction from 0 to 1 and is selected according to the direction of intra prediction and the vertical displacement i.

$$P'ij = Pij + \alpha \cdot (Aj - RAj) \quad \text{Equation (4)}$$

Although the intra gradient filter can be applied in all directional modes v+1~v+8 and h+1~h+8, the intra gradient filter is only applied when the intra prediction mode is DC, Horizontal, or Vertical mode in the HEVC standard. The samples in the first row and first column of the current block are filtered by the intra gradient filter when the selected intra prediction mode is DC mode. The samples in the first row are filtered by the intra gradient filter when the selected intra prediction mode is Horizontal mode, and the samples in the first column are filtered by the intra gradient filter if the selected intra prediction mode is Vertical mode.

MPM List Generation Out of the 35 intra prediction modes supported in the HEVC standard, three intra prediction modes are considered as Most Probable Modes (MPMs) for predicting a current intra prediction mode for a current block. Neighboring intra prediction modes of a left neighboring block and an above neighboring block are included in the three MPMs. In case the two neighboring intra prediction modes are the same directional mode, or only one of the two neighboring intra prediction modes is available and is a directional mode, two neighboring directions immediately next to this directional mode are also included in the three MPMs. DC mode and Planar mode are also considered as MPMs when the left or above neighboring intra prediction mode is not directional or when the neighboring blocks are not available or not coded in intra prediction. A first MPM flag is signaled to indicate whether the current intra prediction mode is identical to one of the three MPMs, if so, another flag is sent to indicate which of the three MPMs is selected; if the first MPM flag is false, the current intra prediction mode is a non-MPM mode and is explicitly signaled using a 5-bit fixed length codeword.

Figure 4:
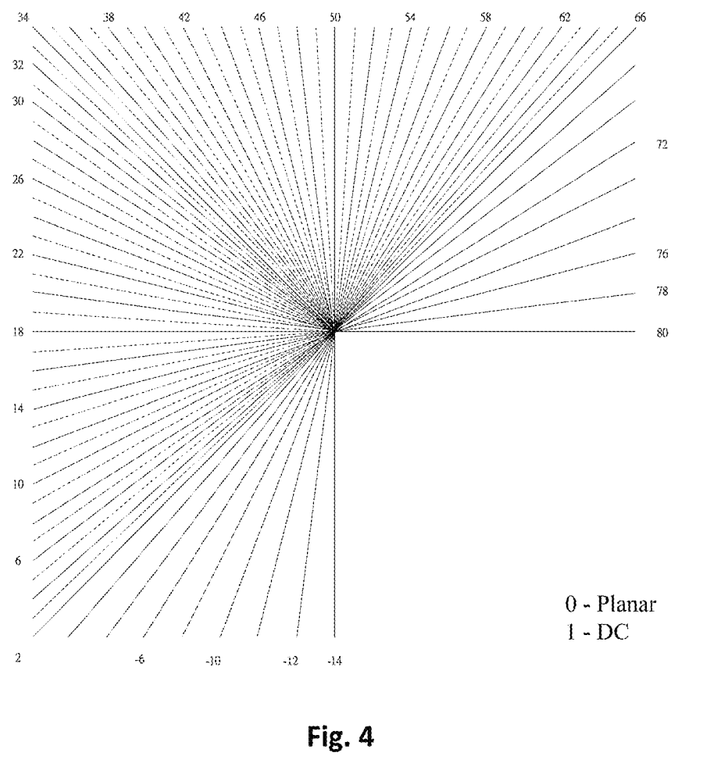
FIG. 4 illustrates an example of 65 angular intra prediction modes.

The 33 angular modes shown in FIG. 1 can be expanded to a general case with more or less angular modes, where each of the angular modes can be represented by mode H+k or mode V+k, where H represents the direction of Horizontal mode, V represents the direction of Vertical mode, and k=0, +-1, +-2, . . . +-K. An example of 65 angular modes for intra prediction is shown in FIG. 4, where k is ranged from -16 to 16. Mode H-16 and mode V-16 are the same mode, where this mode refers to the prediction direction from an upper-left corner to the center of the current block. FIG. 4 illustrates the 65 angular intra prediction modes with additional 32 angular modes in between the original 33 angular modes of HEVC. The 65 angular modes in FIG. 4 include modes H+16 to H-15 from bottom to top at the left boundary of the block and modes V-16 to V+16 from left to right at the upper boundary of the block. These denser directional intra prediction modes can be applied to all block sizes and for both luma and chroma components.

In recent development, an intra mode coding method with 6 MPMs considers two available neighboring intra prediction modes associated with two neighboring blocks, a left block with mode A and an above neighboring block with mode B. The MPM list is constructed by considering the following three aspects: default intra prediction modes, neighboring intra prediction modes, and derived intra prediction modes. The 6 MPM list generation process starts with initializing a default MPM list as {A, Planar (0) or DC (1), Vertical (50), Horizontal (18), VER-4 (46), VER+4 (54)}. In cases when the two neighboring modes A and B are the same and A is greater than DC (1) mode, the MPM list includes three default modes {A, Planar (0), DC (1)} and three derived modes. The three derived modes are obtained by adding predefined offset values to the neighboring mode and performing a modular operation. In cases when two neighboring modes are different, the two neighboring modes are assigned to first two MPMs in the MPM list and the remaining four MPMs are derived from default modes and neighboring modes. During the 6 MPM list generation process, pruning is used to remove duplicated modes so that only unique modes can be included into the MPM list. For entropy coding of the 61 non-MPM modes, a Truncated Binary Code (TBC) is used.

Figure 5A:
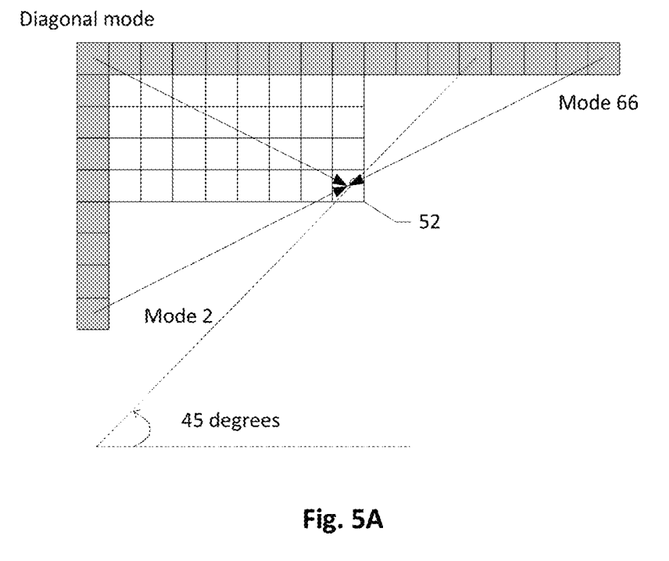
FIGS. 5A and 5B illustrate reference samples for wide-angular intra prediction applied to two exemplary rectangular blocks.
Figure 5B:
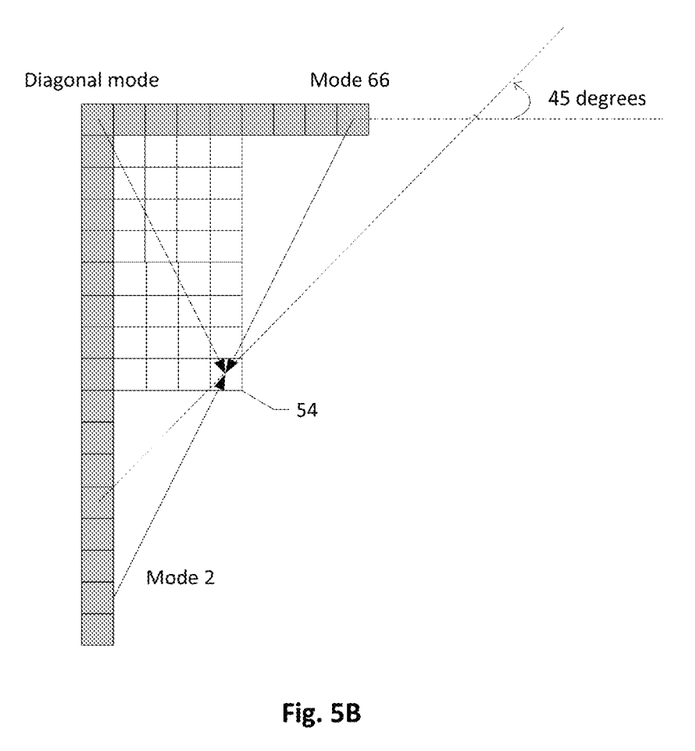

Wide-angle Intra Prediction for Non-square Blocks Several conventional angular intra prediction modes are adaptively replaced with Wide-Angle Intra Prediction (WAIP) modes for non-square blocks. Conventional angular intra prediction directions are defined from 45 degrees to -135 degrees in clockwise direction. In recent development, some original modes are replaced by WAIP modes by using original mode indexes for signaling, actual indexes of the WAIP modes are remapped after parsing, thus the total number of intra prediction mode is unchanged and the intra mode coding method remains unchanged too. To support these WAIP modes, the top reference with length 2W+1 and the left reference with length 2H+1 are defined in FIGS. 5A and 5B. In FIG. 5A, a current block 52 can be predicted by a left reference sample with an angle greater than the angle of mode 2. In FIG. 5B, a current block 54 can be predicted by a top reference sample with an angle greater than the angle of mode 66. The number of replaced modes in wide-angular direction modes depends on the aspect ratio of a block. The replaced intra prediction modes are illustrated in Table 1.

TABLE 1

Intra prediction modes replaced by wide-angular modes

| Aspect ratio | Replaced intra prediction modes |
| --- | --- |
| W/H == 16 | Modes 2, 3, 4, 5, 6, 7, 8, 9, 10, 11, 12, 13, 14, 15 |
| W/H == 8 | Modes 2, 3, 4, 5, 6, 7, 8, 9, 10, 11, 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == ½ | Modes 61, 62, 63, 64, 65, 66 |
| W/H == ¼ | Modes 57, 58, 59, 60, 61, 62, 63, 64, 65, 66 |
| W/H == ⅛ | Modes 55, 56, 57, 58, 59, 60, 61, 62, 63, 64, 65, 66 |
| W/H == 1/16 | Modes 53, 54, 55, 56, 57, 58, 59, 60, 61, 62, 63, 64, 65, 66 |

Figure 6:
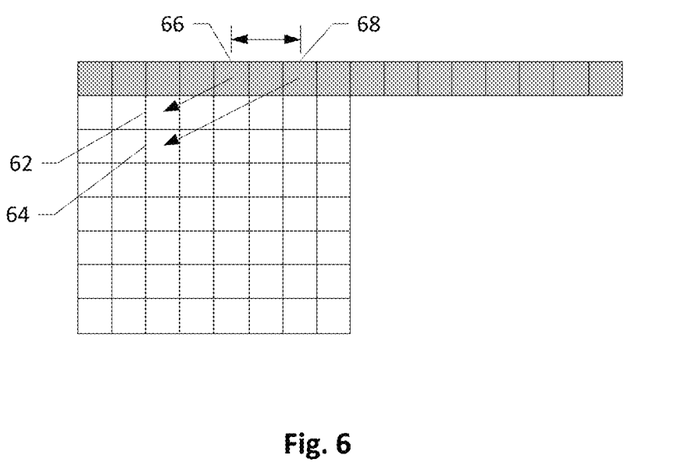
FIG. 6 illustrates discontinuity of reference samples in an example of wide-angle intra prediction.

FIG. 6 illustrates an example of discontinuity of reference samples referred by two vertically-adjacent predicted samples in a current block predicted by wide-angle intra prediction. A space between two reference samples 66 and 68 referred by the two vertically-adjacent predicted samples 62 and 64 is more than 1 sample. A low-pass reference sample filter and side smoothing are applied to wide-angle intra prediction to reduce the negative effect of the increasing gap $\Delta p\alpha$ between the two reference samples 66 and 68, where $\alpha$ is less than 45 degrees.

Mode Dependent Intra Smoothing In the HEVC standard, once a directional prediction mode is decided, except for Planar and DC modes, a two-tap linear interpolation filter is used to generate the intra prediction block according to the directional prediction mode. Four-tap intra interpolation filters are proved to further improve the accuracy of directional intra prediction. For example, a simplified 6-bit four-tap Gaussian interpolation filter is used for directional intra prediction modes, and the non-directional intra prediction process is unmodified. In the development of the incoming video coding standard Versatile Video Coding (VVC), the selection of intra smoothing filters applied on reference samples is determined according to a Mode Dependent Intra Smoothing (MDIS) condition for directional intra prediction modes that provide non-fractional displacements.

By employing MDIS, the reference sample processing in intra prediction is performed depending on the intra prediction mode. The directional intra prediction mode is first classified into one of the three groups: A. vertical mode (VER_IDX) or horizontal mode (HOR_IDX), B. diagonal modes representing angles equal to multiple of 45 degrees (i.e. 2, DIA_IDX, VDIA_IDX), and C. remaining directional modes. Filters are not applied to reference samples for generating predicted samples if the directional intra prediction mode is classified as belonging to group A. An [1, 2, 1] reference sample filter is adaptively applied to reference samples to further copy these filtered values into an intra predictor if the intra prediction mode is classified as belonging to group B. Interpolation filters are not applied to any mode falls into group B. Otherwise, if the intra prediction mode is classified as belonging to group C, only an interpolation filter is applied to reference samples to generate a predicted sample that falls into a fractional or integer position between reference samples according to a selected direction. No reference sample filtering is performed when the intra reference sample interpolation filter is applied to reference samples. In practice, a value minDistVerHor is calculated as a minimum between an absolute value of the current mode minus 50 and an absolute value of the current mode minus 18. minDistVerHor=min(abs(predModeIntra−50), abs(predModeIntra−18)). If minDistVerHor is greater than a threshold intraHorVerDistThres defined in Table 2 or if the current mode is a WAIP mode, a Gaussian interpolation filter is applied to calculate intra prediction samples. Otherwise, a DCT-IF interpolation filter is applied to calculate intra prediction samples.

TABLE 2

Values of the threshold for various transform block sizes

| | | nTbs = (Log$_2$(BlockWidth) + Log$_2$(BlockHeight)) >> 1 | | | | |
|---|---|---|---|---|---|---|
| | | 1 | 2 | 3 | 4 | 5 | Other values |
| intraHorVerDistThres | Luma component | 20 | 20 | 20 | 14 | 2 | 0 |

Position Dependent Intra Prediction Combination In recent development of the incoming video coding standard VVC, prediction results of intra prediction of Planar mode are further modified by a Position Dependent intra Prediction Combination (PDPC) method. The PDPC method is an intra prediction method which invokes a combination of un-filtered boundary reference samples and HEVC style intra prediction with filtered boundary reference samples. PDPC is applied to Planar, DC, horizontal, vertical, bottom-left angular mode and its eight adjacent angular modes, and top-right angular mode and its eight adjacent angular modes without signaling. According to the PDPC method, the prediction sample pred (x,y) is predicted using an intra prediction mode and a linear combination of reference samples according to the following equation.

$$\text{pred}(x,y)=(wL \times R_{(-1,y)}+wT \times R_{(x,-1)}-wTL \times R_{(-1,-1)}+(64-wL-wTL) \times \text{pred}(x,y)+32)>>6 \quad \text{Equation (5)}$$

where $R_{(x,-1)}$, $R_{(-1,y)}$ represent the reference samples located at the top and left of the current sample (x, y), respectively, and $R_{(-1,-1)}$ represents the reference sample located at the top-left corner of the current block.

Figure 7A:
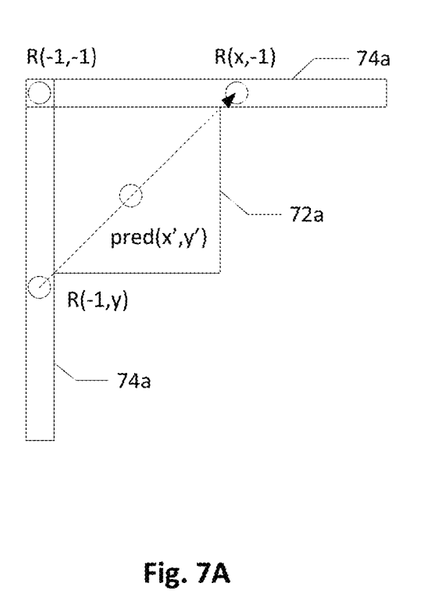
FIGS. 7A-7D illustrate definition of reference samples for Position Dependent intra Prediction Combination (PDPC) applied over diagonal top-right mode, diagonal bottom-left mode, adjacent diagonal top-right mode, and adjacent diagonal bottom-left mode.
Figure 7B:
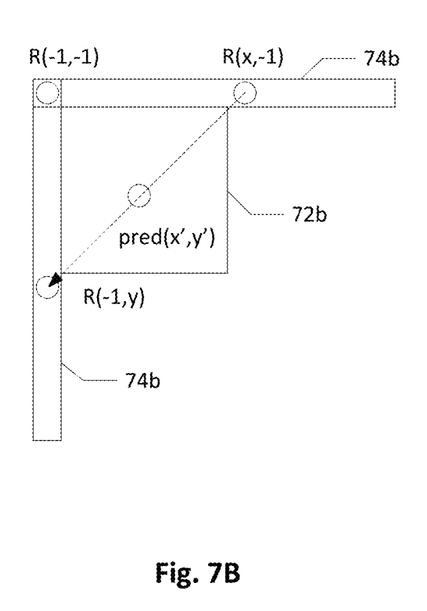
Figure 7C:
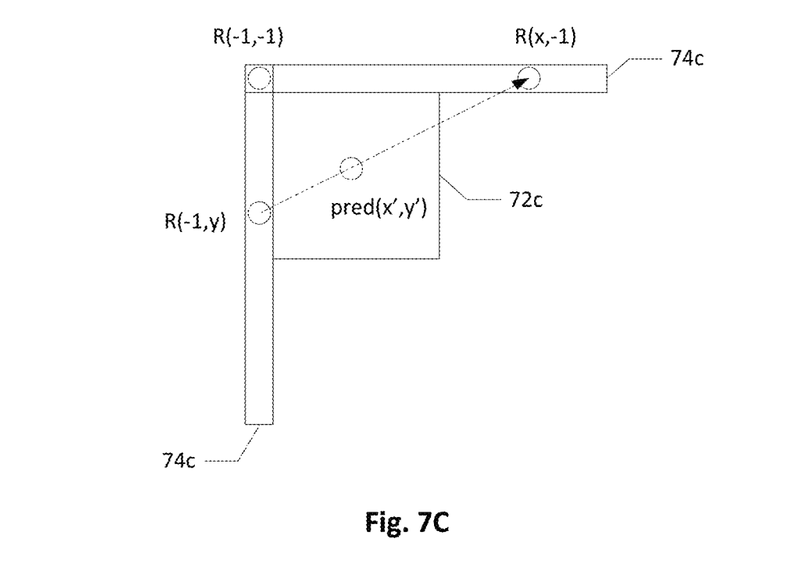
Figure 7D:
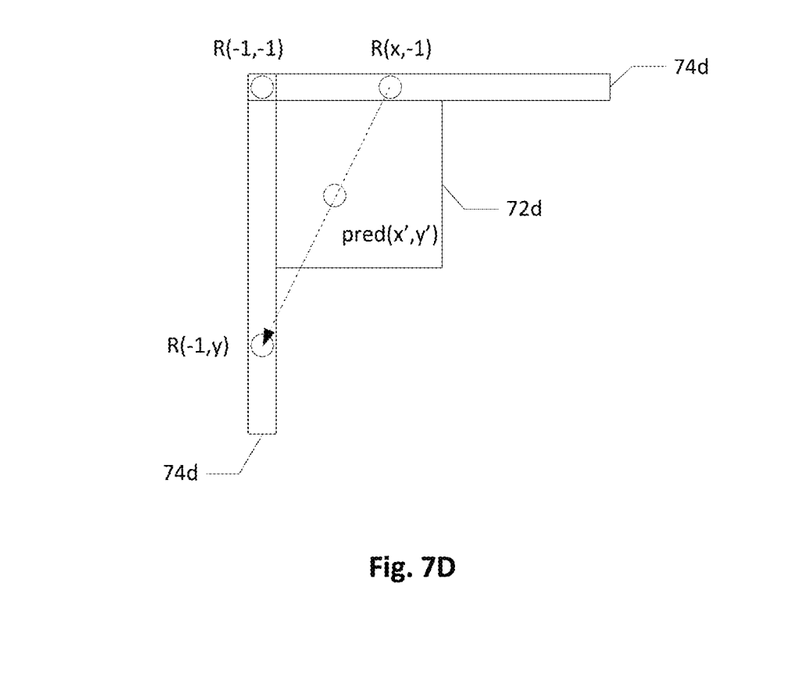

Additional boundary filters are not needed if the PDPC method is applied to DC, Planar, horizontal and vertical modes. FIGS. 7A, 7B, 7C, and 7D illustrate the definition of reference samples 74a, 74b, 74c, or 74d for PDPC applied over various prediction modes. The prediction samples pred(x', y') is located at (x', y') within the prediction block 72a, 72b, 72c, or 72c. FIG. 7A illustrates samples used by PDPC applied to diagonal top-right mode, FIG. 7B illustrates samples used by PDPC applied to diagonal bottom-left mode, FIG. 7C illustrates samples used by PDPC applied to adjacent diagonal top-right mode, and FIG. 7D illustrates samples used by PDPC applied to adjacent diagonal bottom-left mode. In an example, the coordinate x of the reference sample R(x, −1) is given by the equation x=x'+y'+1, and the coordinate of the reference sample R(−1, y) is similarly given by the equation y=x'+y'+1 for the diagonal modes. For the other angular modes, the reference samples R(x,−1) and R (−1, y) are located in fractional sample positions. In this case, the sample value of the nearest integer sample location is used. The PDPC weights are dependent on prediction modes and are shown in Table 3.

TABLE 3

PDPC weights according to prediction modes

| Prediction Modes | wT | wL | wTL |
|---|---|---|---|
| DC | 32 >> ((y' << 1) >> shift) | 32 >> ((x' << 1) >> shift) | (wL >> 4) + (wT >> 4) |
| Horizontal | 32 >> ((y' << 1) >> shift) | 0 | wT |
| Vertical | 0 | 32 >> ((y' << 1) >> shift) | wL |
| Planar | 32 >> ((y' << 1) >> shift) | 32 >> ((x' << 1) >> shift) | 0 |
| 2 | 16 >> ((y' << 1) >> shift) | 16 >> ((x' << 1) >> shift) | 0 |
| 66 | 16 >> ((y' << 1) >> shift) | 16 >> ((x' << 1) >> shift) | 0 |
| 3-10 | 32 >> ((y' << 1) >> shift) | 0 | 0 |
| 58-65 | 0 | 32 >> ((x' << 1) >> shift) | 0 |

BRIEF SUMMARY OF THE INVENTION

A video encoding or decoding method and apparatus for processing video data coded or to be coded by intra prediction in a video coding system are disclosed. Embodiments of the video coding system receive input data associated with a current block in a current picture. The video coding system determines an intra prediction mode for the current block, and then determines reference samples of the current block according to the intra prediction mode. An intra reference sample filter is determined for the current block from a Gaussian interpolation filter and an alternative interpolation filter according to the intra prediction mode and a block size of the current block. The determination between the Gaussian interpolation filter and the alternative interpolation filters is depending on a comparison of a mode difference value calculated by the intra prediction mode with a size-dependent threshold. The size-dependent threshold is set to be equal to or larger than 24 for blocks with block size smaller than or equal to 32 samples, or for 4×4, 4×8, and 8×4 blocks. The intra reference sample filter is applied to the reference samples of the current block to generate an intra predictor for the current block, and the intra predictor is used to encode or decode the current block.

In some embodiments, the mode difference value calculated by the intra prediction mode is a minimum of an absolute mode number difference between the intra prediction mode and a horizontal mode and an absolute mode number difference between the intra prediction mode and a vertical mode. The horizontal mode number is 18 and the vertical mode number is 50. The Gaussian interpolation filter is selected for the current block when the mode difference value calculated by the current intra prediction mode is larger than the size-dependent threshold, and the alternative interpolation filter is selected when the mode difference value calculated by the current intra prediction mode is smaller than or equal to the size-dependent threshold. The reference samples of the current block are determined from neighboring reconstructed samples of the current block according to the intra prediction mode.

In some embodiments, the size-dependent threshold for the current block is determined according to a variable nTbS, and the variable nTbS is defined as Log 2 of a width of the current block plus Log 2 of a height of the current block shifted by one. The size-dependent threshold for the current block is equal to 24 when the variable nTbS is equal to 2 according to a preferred embodiment. In this embodiment, the size-dependent threshold is equal to 14 when the variable nTbS is equal to 3, the size-dependent threshold is equal to 2 when the variable nTbS is equal to 4, and the size-dependent threshold is equal to 0 when the variable nTbS is equal to or larger than 5.

The alternative interpolation filter may be a Cubic or DCT-IF interpolation filter. The intra prediction mode of the current block is a regular directional intra prediction mode or a wide-angle intra prediction mode. The current block is a luma CB and the block size counts a number of luma samples in the current block.

In some exemplary embodiments, a [1 2 1] reference sample smoothing filter is determined for the current block when the block size is larger than 32 samples and when the intra prediction mode of the current block is a predefined mode. For example, the predefined mode is one or a combination of Planar mode, modes −14, −12, −10, −6, 2, 34, 72, 76, 78, and 80.

Some embodiments of the processing method will not select the Gaussian interpolation filter for filtering the reference samples if the intra prediction mode of the current block is one of Planar mode, modes −14, −12, −10, −6, 2, 34, 66, 72, 76, 78, and 80.

The alternative interpolation filter is selected for the current block if the intra prediction mode is a vertical or horizontal mode, or if a [1 2 1] reference sample smoothing filter is determined according to some embodiments, and the alternative interpolation filter is a DCT-IF filter with coefficients [0 64 0 0]. In another embodiment, no filter is applied to the reference samples of the current block if the intra prediction mode is a vertical or horizontal mode.

According to an embodiment, a [1 2 1] reference sample smoothing filter is not selected for the current block if the block size is 4×4, 4×8 or 8×4 and the intra prediction mode is mode 2, 34, or 66, or if the block size is 4×8 and the intra prediction mode is mode −6, or if the block size is 8×4 and the intra prediction mode is mode 72.

The [1 2 1] reference sample filter and the Gaussian interpolation filter are only selected for the current block if the block size is larger than 32 samples according to an embodiment. The alternative interpolation filter is a DCT-IF interpolation filter, and the DCT-IF interpolation filter is always selected for the current block if the block size is 4×4, 4×8, or 8×4 or the block size is smaller than or equal to 32 samples.

Aspects of the disclosure further provide an apparatus in a video coding system for receiving input data associated with a current block coded or to be coded by intra prediction, determining an intra prediction mode and reference samples of the current block accordingly, determining an intra reference sample filter from a Gaussian interpolation filter and an alternative interpolation filter according to the intra prediction mode and a block size of the current block, applying the intra reference sample filter to the reference samples to generate an intra predictor for the current block, and encoding or decoding the current block based on the intra predictor. A selection between the Gaussian interpolation filter and the alternative interpolation filter is depending on a comparison of a mode difference value calculated by the intra prediction mode with a size-dependent threshold. The size-dependent threshold is set to be equal to or larger than 24 for blocks with block size smaller than or equal to 32 samples.

Aspects of the disclosure further provide a non-transitory computer readable medium storing program instructions for causing a processing circuit of an apparatus to encode or decode video data of a current block by intra prediction with an intra reference sample filter selected according to an intra prediction mode and a block size of the current block. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

It will be readily understood that modules and components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Treating WAIP modes as Regular Directional Intra Mode for Interpolation Filter Selection As previous described, a low-pass reference sample filter and side smoothing filter are applied to Wide-Angle Intra Prediction (WAIP) modes to reduce the negative effect of the increasing gap between the two reference samples. Some embodiments of the present invention treat the WAIP modes the same as regular directional intra prediction modes for selecting an interpolation filter in the intra prediction process. A Mode Dependent Intra Smoothing (MDIS) interpolation filter selection condition is always used to determine regardless the current intra prediction mode is a WAIP mode or a regular directional intra prediction mode. The MDIS interpolation filter selection condition checks if a value minDistVerHor is greater than a threshold. The value minDistVerHor is calculated by a minimum of an absolute mode number difference between a current intra prediction mode and the horizontal mode and an absolute mode number difference between the current intra prediction mode and the vertical mode. A Gaussian interpolation filter is selected for a current block if the check of MDIS interpolation filter selection condition is true; otherwise an alternative interpolation filter is selected. Some examples of the alternative interpolation filter include a Cubic and DCT-IF interpolation filters.

Determine Intra Smoothing Filter based on Block Size and Intra Prediction Mode Neighboring reconstructed samples of one or more color components of a current block are used as reference samples for predicting the current block coded in intra prediction. Embodiments of the present invention improve the design of MDIS in intra prediction. In some exemplary embodiments, one type of intra reference sample filters is determined for each intra coded block among an [1 2 1] reference sample smoothing filter, a Gaussian interpolation filter, and a DCT-IF interpolation filter based on multiple checks. The [1 2 1] reference sample smoothing filter is applied to reconstructed boundary samples of a current block when a predefined condition is met. For example, the current block is a luma Coding Block (CB). An embodiment of the predefined condition for selecting the [1 2 1] reference sample smoothing filter is when a size of the current luma CB is larger than 32 luma samples and the current intra prediction mode is one of predefined modes. For example, the predefined modes include one or a combination of modes −14, −12, −10, −6, 2, 34, 66, 72, 76, 78, and 80, and Planar mode. Another embodiment of the predefined condition is when the current intra prediction mode is one of diagonal modes having an angle which is a multiple of 45 degrees, such as mode 2, 34, or 66. As shown in FIG. 4, modes −14, −12, −10, −6, 72, 76, 78, and 80 are various wide-angular direction modes, and modes 2, 34, and 66 are diagonal modes that represent angles which are multiples of 45 degrees. In one embodiment, when the [1 2 1] reference sample smoothing filter is selected for a current block, a DCT-IF filter with coefficients [0 64 0 0] is used to filter reference samples of the current block.

If the [1 2 1] reference sample smoothing filter is not selected, the Gaussian interpolation filter is conditionally applied to a current block to generate an intra predictor according to the intra prediction mode of the current block. In one embodiment, the Gaussian interpolation filter is applied when both of the following conditions are true. The first condition is true when a current intra prediction mode is not any of Planar mode, modes −14, −12, −10, −6, 2, 34, 66, 72, 76, 78, and 80. The second condition is true when a minimum of an absolute mode number difference between the current intra prediction mode and the horizontal mode and an absolute mode number difference between the current intra prediction mode and the vertical mode (i.e. minDisVerHor) is larger than a size-dependent threshold. The vertical prediction mode number is 50 and the horizontal prediction mode number is 18. The mode difference value minDistVerHor is calculated as a minimum between an absolute value of the current mode minus 50 and an absolute value of the current mode minus 18. The equation for deriving the value minDistVerHor is: minDistVerHor=min (abs(predModeIntra−50), abs(predModeIntra−18)). In another embodiment, no matter the current intra prediction mode is a WAIP mode or a regular directional intra prediction mode, the Gaussian interpolation filter is applied when the mode difference value minDisVerHor is larger than a size-dependent threshold. In some embodiments of the present invention, the size-dependent threshold intraHorVerDistThres for a current block is equal to 24 when a variable nTbS for the current block is equal to 2, where the variable nTbS is defined as Log 2 (Block Width)+Log 2 (Block Height)>>1. In other words, the size-dependent threshold intraHorVerDistThres for a current block is equal to 24 when a block size of the current block is 4×4, 4×8, or 8×4 samples, which means when a block area of the current block is smaller than or equal to 32 samples. In one embodiment, the threshold intraHorVerDistThres is equal to 14 when the variable nTbS is equal to 3, and is equal to 2 when the variable nTbS is equal to 4. In this embodiment, when the variable nTbS is equal to 5, 6, or 7, the size-dependent threshold intraHorVerDistThres is equal to 0. The variable nTbS for a current block is equal to or greater than 5 when the block size is equal to or larger than 1024 samples (i.e. 32×32, 16×16, or 64×16). That is, if reference samples of a current block are not filtered by the [1 2 1] reference sample smoothing filter, the Gaussian interpolation filter is applied for the current block with a size equal to or larger than 32×32, 16×64, or 64×16 samples and coded by a directional intra prediction mode except vertical and horizontal modes. For example, for a block larger than 1024 samples and with an intra prediction mode not equal to Planar mode, vertical mode, horizontal mode, mode −14, mode −12, mode −10, mode −6, mode 2, mode 34, mode 66, mode 72, mode 76, mode 78, or mode 80, the Gaussian interpolation filter is applied to the neighboring reconstructed samples. Otherwise, a DCT-IF interpolation filter is applied to the neighboring reconstructed samples for any block coded using a directional intra prediction mode.

Compared to the conventional protocol, in embodiments of the present application, setting of the size-dependent threshold intraHorVerDistThres has changed. For example, for nTbS equal to 2, the size-dependent threshold intraHorVerDistThres is changed to 24. Increasing the size-dependent threshold intraHorVerDistThres for nTbS equal to 2 results in increasing the probability of using a DCT-IF interpolation filter for small blocks. This reflects some important concepts of the present application. The need for a strong intra interpolation filter (e.g. Gaussian filter) for small blocks is not as much as for larger blocks. Thus, according to embodiments of the present claimed application, increasing the probability of using a DCT-IF interpolation filter for small blocks would decrease probability of using a Gaussian interpolation filter, such that a simplified and efficient interpolation results, where Gaussian interpolation filter causes a much more complexity and resource than the DCT-IF interpolation filter for the encoding/decoding process. In the embodiment of setting the size-dependent threshold intraHorVerDistThres to equal to 24 for a block with a variable nTbS equal to 2 or for a block with a size equal to 4×4, 4×8, or 8×4 samples, the value minDistVerHor is less than or equal to 24 when the intra prediction mode is any mode between modes −6 and 74. A DCT-IF interpolation filter is thus applied to all 4×4, 4×8, and 8×4 blocks coded by any mode between modes −6 and 74. A Gaussian interpolation filter is only applied to 4×4, 4×8, and 8×4 blocks coded by any mode between modes −14 and −7 or any mode between modes 75 to 80. In another embodiment, the threshold intraHorVerDistThres for nTbS equal to 2 is set to be equal to or larger than 24. In some other embodiments, the threshold intraHorVerDistThres for nTbS equal to 2 is set to 17, 18, 19, 21, or 22, so a DCT-IF interpolation filter is used for 4×4, 4×8, and 8×4 blocks coded by modes corresponding to the value minDistVerHor less than or equal to 17, 18, 19, 21, or 22 respectively. For example, when the threshold intraHorVerDistThres for nTbS equal to 2 is set to 21, a DCT-IF interpolation filter is used for a small block with a block area smaller than or equal to 32 samples and coded by any mode between modes −3 and 71, otherwise a Gaussian interpolation filter is selected for the small block.

Since a current block coded by a vertical (mode 50) or horizontal mode (mode 18) corresponds to minDistVerHor=0, an alternative filter, e.g. a DCT-IF filter, is always selected regardless the size of the current block. A DCT-IF filter with coefficients [0 64 0 0] is used to filter neighboring reconstructed samples of an intra coded block coded by the vertical or horizontal intra prediction mode according to one embodiment. In another embodiment, the encoder or decoder does not need to select a filter among the intra reference sample filters for blocks coded by vertical (mode 50) and horizontal (mode 18) modes as neighboring reconstructed samples of these blocks are not filtered in intra prediction.

One embodiment of the predefined condition for determining the [1 2 1] reference sample smoothing filter is described in the following. The [1 2 1] reference sample filter will not be applied (e.g. is excluded) to a current block if a current block size is 4×4, 4×8, or 8×4 samples and the applied intra prediction mode is mode 2, 34, or 66. The [1 2 1] reference sample filter will not be applied (e.g. is excluded) to the current block if the current block size is 4×8 samples and the applied intra prediction mode is mode −6, and the [1 2 1] reference sample filter will not be applied to the current block if the current block size is 8×4 samples and the applied intra prediction mode is mode 72. For other block sizes, the [1 2 1] reference sample filtering can be selectively/conditionally applied to the current block according to the intra prediction mode of the current block.

DCT-IF Interpolation Filter for Small Blocks In some embodiments of the present invention, a [1 2 1] reference sample filter or Gaussian interpolation filter is only applied to blocks with block sizes larger than 32 samples, so neither the [1 2 1] reference sample filter nor the Gaussian interpolation filter is applied to a current block when a block size is 4×4, 4×8, or 8×4 or when a block area is smaller than or equal to 32 samples. A DCT-IF interpolation filter is applied to the current block when the block size is 4×4, 4×8, or 8×4 samples or when the block area is smaller than or equal to 32 samples. In this embodiment, for blocks with sizes larger than 4×4, 4×8, or 8×4 samples or areas larger than 32 samples, the [1 2 1] reference sample filter is applied when criteria according to the intra prediction mode of the current block or both the intra prediction mode and the block size of the current block are met. For example, the [1 2 1] reference sample filter is applied to the reference samples of the current block when the intra prediction mode is a diagonal mode such as mode 2, mode 34, or mode 66 according to one embodiment. In an alternative embodiment, the [1 2 1] reference sample filter is applied to the reference samples of the current block when the intra prediction mode is one of Planar mode, modes −14, −12, −10, −6, 2, 34, 66, 72, 76, 78, and 80.

Simplified Position Dependent Intra Prediction Combination In some embodiments of applying Position Dependent intra Prediction Combination (PDPC) to current prediction samples, neighboring reference samples used in PDPC are from unfiltered samples, and the prediction samples used in PDPC are interpolated by an interpolation filter. In one embodiment, the neighboring reference samples $R_{(x,-1)}$, $R_{(-1,y)}$ and $R_{(-1,-1)}$ for PDPC are intra reference samples without reference sample filtering. Besides, the prediction sample pred(x,y) is interpolated by an interpolation filter. In another embodiment, if the neighboring reference samples $R_{(x,-1)}$, $R_{(-1,y)}$ and $R_{(-1,-1)}$ for PDPC are intra reference samples without reference sample filtering, and the prediction sample pred(x,y) is also not interpolated by an interpolation filter, then PDPC is disabled for the current intra prediction mode. In one embodiment, PDPC is only allowed for block areas larger than S in order to minimize the latency for smaller blocks. For example, S is 32, 64, or 128 samples. In another embodiment, in cases when only blocks with areas larger than S are allowed to apply a reference smoothing filter or reference sample interpolation, PDPC is also only allowed for blocks with areas larger than S. Some examples of S are 32, 64, and 128 samples. In still another embodiment, when applying PDPC, only for intra prediction modes not one of DC, Planar, horizontal, and vertical modes, the neighboring reference samples $R_{(x,-1)}$, $R_{(-1,y)}$ and $R_{(-1,-1)}$ for PDPC are intra reference samples without reference sample filtering and the prediction sample pred(x,y) is interpolated by an interpolation filter.

In another embodiment, the [1 2 1] reference sample filter is not used if the current intra prediction mode is belong to a mode represents an angle which is a multiple of 45 degrees. A Gaussian interpolation filter is applied instead to generate intra prediction samples. In other words, except for DC, Planar, horizontal, and vertical modes, when applying PDPC, the neighboring reference samples $R_{(x,-1)}$, $R_{(-1,y)}$ and $R_{(-1,-1)}$ are not processed by reference sample filtering, and the prediction sample pred(x,y) is interpolated by an interpolation filter. In one embodiment, for Planar mode with PDPC, the neighboring reference samples $R_{(x,-1)}$, $R_{(-1,y)}$ and $R_{(-1,-1)}$ are not processed by reference sample filtering, and the unfiltered neighboring reference samples and the prediction sample pred(x,y) are used for PDPC. In another embodiment, for Planar mode with PDPC, the unfiltered reference samples $R_{(x,-1)}$, $R_{(-1,y)}$ and $R_{(-1,-1)}$ are used for PDPC, but before applying PDPC, the prediction sample pred(x,y) is generated by using filtered neighboring reference samples.

Figure 8:
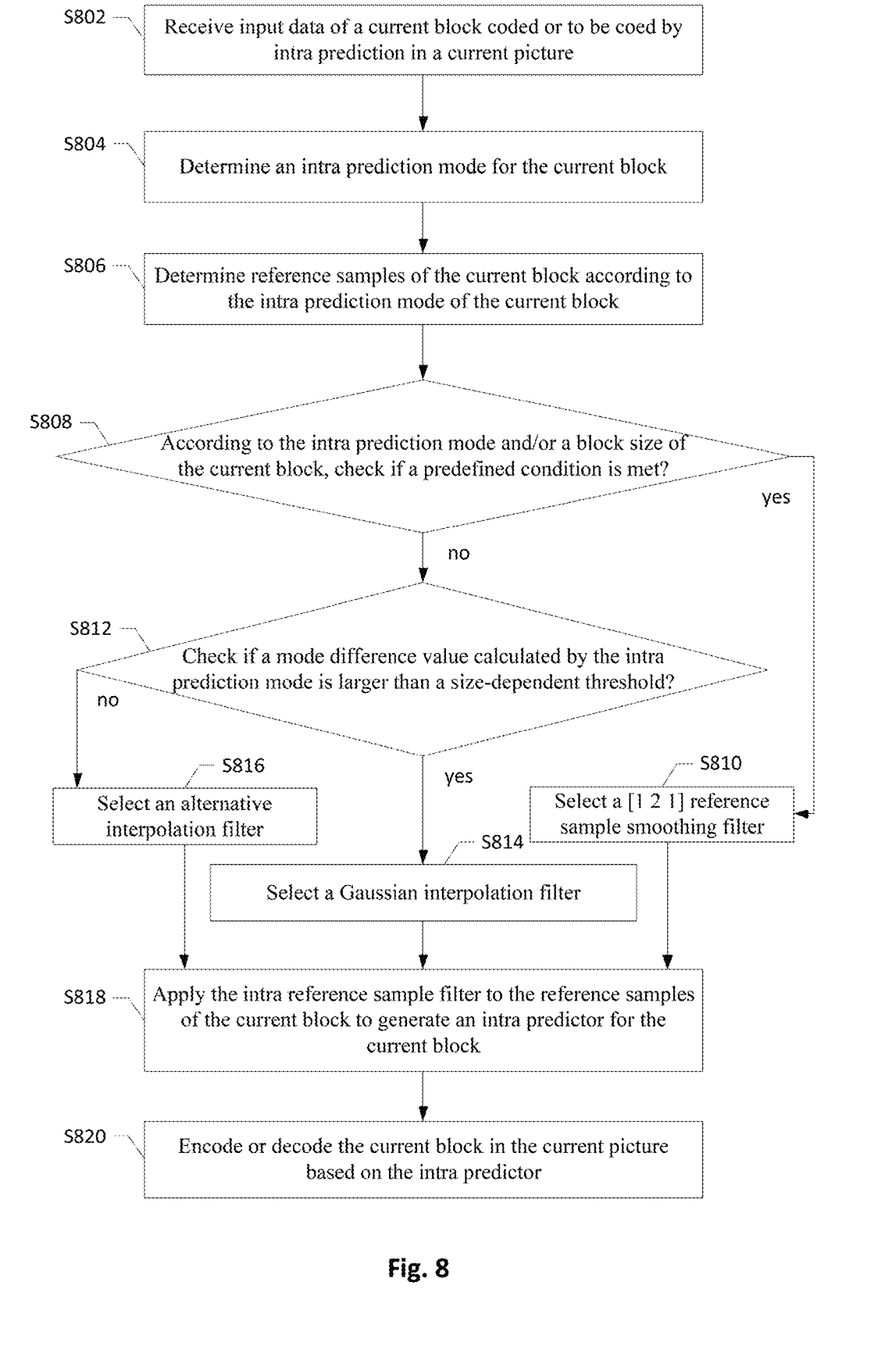
FIG. 8 is a flowchart illustrating an exemplary method according to an embodiment of the present invention.

Representative Flowchart FIG. 8 is a flowchart illustrating video processing method for processing a current block coded or to be coded by intra prediction according to embodiments of the present invention. A video encoder or decoder receives input data of the current block in a current picture in step S802. In steps S804 and S806, the video encoder or decoder determines an intra prediction mode for the current block and determines reference samples of the current block according to the intra prediction mode. The video encoder or decoder checks if a predefined condition is met for the current block according to one or both of the intra prediction mode and a block size of the current block in step S808. For example, the predefined condition is met when the block size is larger than 32 samples and when the intra prediction mode is one of Planar mode, modes −14, −12, −10, −6, 2, 34, 66, 72, 76, 78, and 80. If the predefined condition is met, a [1 2 1] reference sample smoothing filter is determined/selected for the current block in step S810, else the video encoder or decoder checks if a mode difference value calculated by the intra prediction mode is larger than a size-dependent threshold in step S812. An example of the mode difference value calculated by the intra prediction mode minDistVerHor is a minimum between a mode number difference of the horizontal mode and a mode number difference of the vertical mode, i.e. minDistVerHor=min(abs (predModeIntra-50), abs(predModeIntra-18), 50 represents mode 50 and 18 represents mode 18 herein. The size-dependent threshold is set to be equal to 24 for blocks with block size smaller than or equal to 32 samples. A Gaussian interpolation filter is determined/selected for the current block in step S814 if the mode difference value calculated by the intra prediction mode is larger than the size-dependent threshold, otherwise an alternative interpolation filter is determined for the current block in step S816 if the value calculated by the intra prediction mode is smaller than or equal to the size-dependent threshold. Some examples of the alternative interpolation filter are Cubic and DCT-IF interpolation filters. The intra reference sample filter determined above is then applied to the reference samples of the current block to generate an intra predictor for the current block in step S818. The video encoder or decoder encodes or decodes the current block in the video picture based on the intra predictor in step S820.

Figure 9:
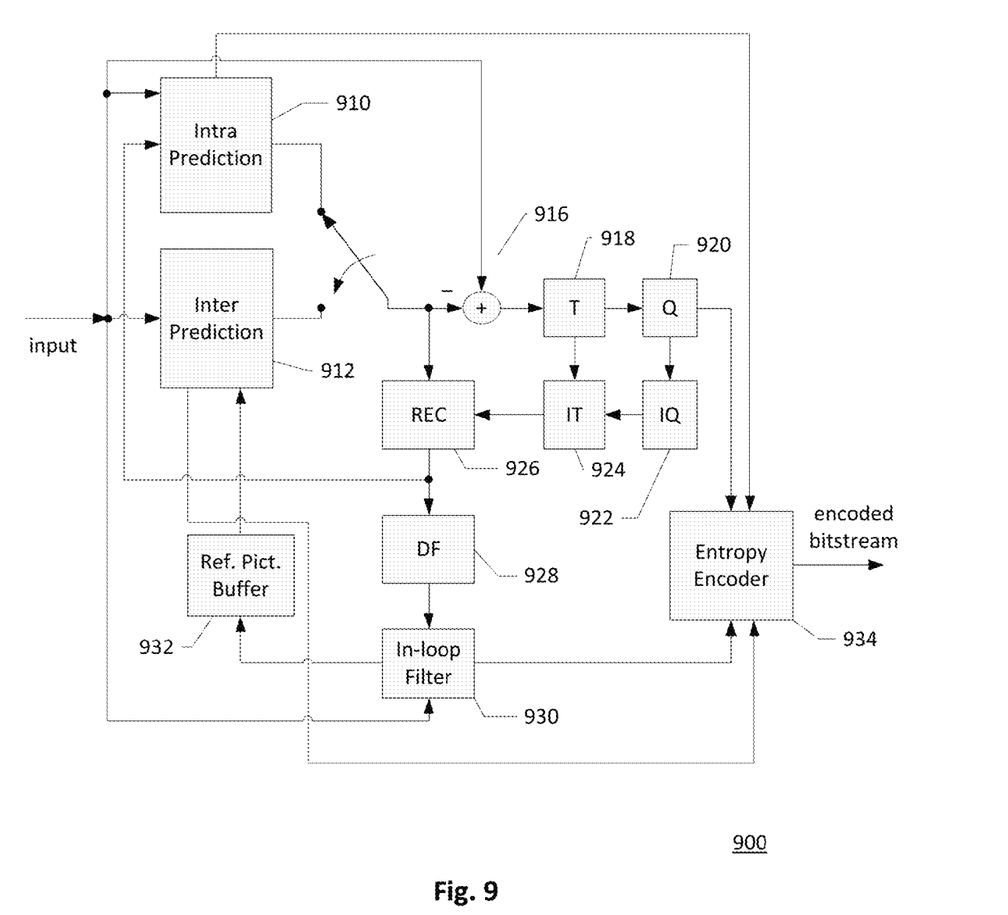
FIG. 9 illustrates an exemplary system block diagram for a video encoding system incorporating the video processing method according to embodiments of the present invention.

Representative Block Diagrams FIG. 9 illustrates an exemplary system block diagram for a Video Encoder 900 implementing one or more of the video processing methods of the present invention. A current block is to be encoded by intra prediction according to neighboring reconstructed samples. An Intra Prediction module 910 determines an intra prediction mode for the current block and then determines reference samples of the current block according to the intra prediction mode. The Intra Prediction module 910 determines an intra reference sample filter from a Gaussian interpolation filter and a DCT-IF interpolation filter according to the intra prediction mode and a block size of the current block. A determination or selection between the Gaussian interpolation filter and the DCT-IF interpolation filter is depending on a comparison of a value calculated by the intra prediction mode with a size-dependent threshold, and the size-dependent threshold is set to be equal to or larger than 24 for blocks with block size smaller than or equal to 32 samples. The Intra Prediction module 910 generates an intra predictor by applying the intra reference sample filter to the reference samples of the current block. An Inter Prediction module 912 performs motion estimation (ME) and motion compensation (MC) to provide inter predictors based on video data from other picture or pictures. Either the Intra Prediction module 910 or Inter Prediction module 912 supplies the selected predictor to an Adder module 916 to form prediction errors, also called prediction residues. Since the current block is encoded by intra prediction, the Intra Prediction module 910 sends the intra predictor for the current block to the Adder module 916 to produce prediction residues of the current block.

The prediction residues of the current block are further processed by a Transformation module (T) 918 followed by a Quantization module (Q) 920. The transformed and quantized residual signal is then encoded by an Entropy Encoder 934 to form an encoded video bitstream. The encoded video bitstream is then packed with side information. The transformed and quantized residual signal of the current block is processed by an Inverse Quantization module (IQ) 922 and an Inverse Transformation module (IT) 924 to recover the prediction residues. As shown in FIG. 9, the prediction residues are recovered by adding back to the selected predictor at a Reconstruction module (REC) 926 to produce reconstructed samples. The reconstructed samples may be stored in a Reference Picture Buffer (Ref. Pict. Buffer) 932 and used for prediction of other pictures. The reconstructed samples from the REC 926 may be subject to various impairments due to the encoding processing, consequently, an in-loop processing Deblocking Filter (DF) 928 and an in-loop filter 930 are applied to the reconstructed samples before storing in the Reference Picture Buffer 932 to further enhance picture quality. Syntax associated with information for the in-loop processing DF 928 and in-loop filter 930 are provided to the Entropy Encoder 934 for incorporation into the encoded video bitstream.

Figure 10:
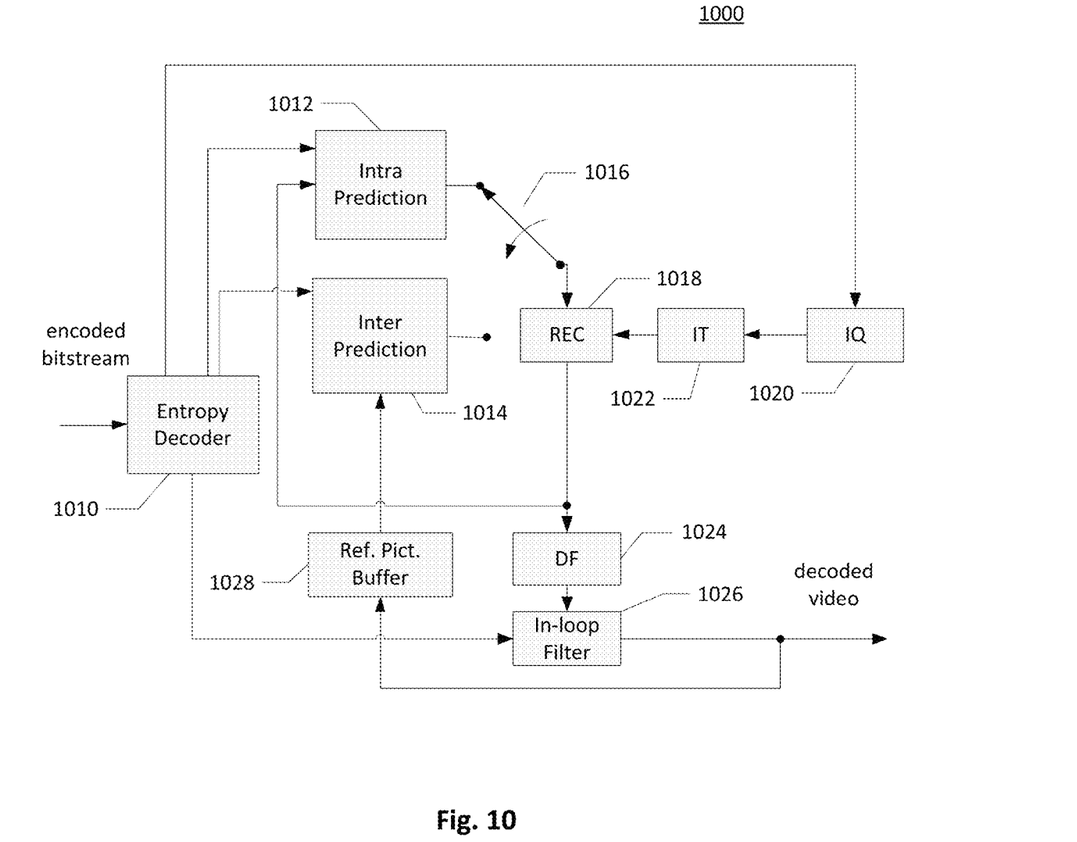
FIG. 10 illustrates an exemplary system block diagram for a video decoding system incorporating the video processing method according to embodiments of the present invention.

A corresponding Video Decoder 1000 for the Video Encoder 900 of FIG. 9 is shown in FIG. 10. The encoded video bitstream is the input to the Video Decoder 1000 and is decoded by the Entropy Decoder 1010 to parse and recover the transformed and quantized residual signal and other system information. The decoding process of the Decoder 1000 is similar to the reconstruction loop at the Encoder 900, except the Decoder 1000 only requires motion compensation prediction in an Inter Prediction module 1014. Each block is decoded by either an Intra Prediction module 1012 or the Inter Prediction module 1014. A Switch module 1016 selects an intra predictor from the Intra Prediction module 1012 or an Inter predictor from the Inter Prediction module 1014 according to decoded mode information. The Intra Prediction module 1012 decodes an intra prediction mode for a current block according to embodiments of the present invention, and determines reference samples of the current block according to the intra prediction mode. According to the intra prediction mode and a block size of the current block, an intra reference sample filter is determined from a Gaussian interpolation filter and a DCT-IF interpolation filter for the current block. A mode difference value calculated by the intra prediction mode is compared with a size-dependent threshold, and the Gaussian interpolation filter is selected for the current block if the mode difference value calculated by the intra prediction mode is larger than the size-dependent threshold, otherwise the DCT-IF interpolation filter is selected. The Intra Prediction module 1012 applies the intra reference sample filter to the reference samples of the current block to generate an intra predictor for the current block. The transformed and quantized residual signal associated with each block is recovered by an Inverse Quantization module (IQ) 1020 and an Inverse Transformation module (IT) 1022. The recovered transformed and quantized residual signal is reconstructed by adding back the predictor in the REC module 1018 to produce reconstructed samples. The reconstructed samples are further processed by a DF 1024 and an in-loop filter 1026 to generate final decoded video. If the currently decoded picture is a reference picture, the reconstructed samples of the currently decoded picture are also stored in a Reference Picture Buffer 1028 for later pictures according to a decoding order.

Various components of the Video Encoder 900 and Video Decoder 1000 in FIG. 9 and FIG. 10 may be implemented by hardware components, one or more processors configured to execute program instructions stored in a memory, or a combination of hardware and processor. For example, a processor executes program instructions to control selecting a filter among multiple reference sample filters for each intra coded block. The processor is equipped with a single or multiple processing cores. In some examples, the processor executes program instructions to perform functions in some components in the Encoder 900 and Decoder 1000, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 9 and 10, the Encoder 900 and Decoder 1000 may be implemented in the same electronic device, so various functional components of the Encoder 900 and Decoder 1000 may be shared or reused if implemented in the same electronic device. For example, one or more of the Reconstruction module 926, Inverse Transformation module 924, Inverse Quantization module 922, Deblocking Filter 928, in-loop filter 930, and Reference Picture Buffer 932 in FIG. 9 may also be used to function as the Reconstruction module 1018, Inverse Transformation module 1022, Inverse Quantization module 1020, Deblocking Filter 1024, in-loop filter 1026, and Reference Picture Buffer 1028 in FIG. 10, respectively.

Embodiments of the processing method for a video coding system may be implemented in a circuit integrated into a video compression chip or program code integrated into video compression software to perform the processing described above. For examples, selecting a filter among multiple reference sample filters for each intra coded block may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of encoding or decoding video data in a video coding system, comprising:
   receiving input data associated with a current block coded or to be coded by intra prediction in a video picture;
   determining an intra prediction mode for the current block;
   determining reference samples of the current block according to the intra prediction mode of the current block;
   determining an intra reference sample filter from a Gaussian interpolation filter and an alternative interpolation filter according to the intra prediction mode and a block size of the current block, wherein the determining between the Gaussian interpolation filter and the alternative interpolation filter is depending on a comparison of a mode difference value calculated by the intra prediction mode with a size-dependent threshold, wherein the size-dependent threshold is determined according to a variable nTbS, and the variable nTbS is defined as Log 2 of a width of the current block plus Log 2 of a height of the current block shifted by one (nTbS=Log 2(width)+Log 2(height)>>1), wherein the size-dependent threshold is set to be equal to 24 for blocks with block sizes smaller than or equal to 32 samples, wherein the mode difference value calculated by the intra prediction mode is a minimum of an absolute mode number difference between the intra prediction mode and a horizontal mode and an absolute mode number difference between the intra prediction mode and a vertical mode;
   applying the intra reference sample filter to the reference samples of the current block to generate an intra predictor for the current block; and
   encoding or decoding the current block in the video picture based on the intra predictor.

2. The method of claim 1, wherein the Gaussian interpolation filter is determined to be applied when the mode difference value calculated by the intra prediction mode of the current block is larger than the size-dependent threshold, and the alternative interpolation filter is determined to be applied when the mode difference value calculated by the intra prediction mode of the current block is smaller than or equal to the size-dependent threshold.

3. The method of claim 1, wherein the reference samples of the current block are determined from neighboring reconstructed samples of the current block.

4. The method of claim 1, wherein the size-dependent threshold is equal to 24 when the variable nTbS is 2.

5. The method of claim 1, wherein the size-dependent threshold is equal to 14 when the variable nTbS is 3, the size-dependent threshold is equal to 2 when the variable nTbS is 4, and the size-dependent threshold is equal to 0 when the variable nTbS is equal to or larger than 5.

6. The method of claim 1, wherein the alternative interpolation filter is a Cubic or DCT-IF interpolation filter.

7. The method of claim 1, wherein the intra prediction mode of the current block is a regular directional intra prediction mode or a wide-angle intra prediction mode.

8. The method of claim 1, wherein the current block is a luma Coding Block (CB), and the block size counts a number of luma samples in the current block.

9. The method of claim 1, further comprising: determining a [1 2 1] reference sample smoothing filter for the current block when the block size is larger than 32 samples and when the intra prediction mode of the current block is a predefined mode.

10. The method of claim 9, wherein the predefined mode is one or a combination of Planar mode, modes −14, −12, −10, −6, 2, 34, 66, 72, 76, 78, and 80.

11. The method of claim 1, wherein the determining step comprises excluding the Gaussian interpolation filter when the intra prediction mode of the current block is one of Planar mode, modes −14, −12, −10, −6, 2, 34, 66, 72, 76, 78, and 80.

12. The method of claim 1, wherein the determining step comprises determining the alternative interpolation filter for the current block if the intra prediction mode is a vertical or horizontal mode, and the alternative interpolation filter is a DCT-IF filter with coefficients [0 64 0 0].

13. The method of claim 1, wherein the determining step comprises excluding a [1 2 1] reference sample smoothing filter for the current block if the block size is 4×4, 4×8, or 8×4 and the intra prediction mode is mode 2, 34, or 66, or if the block size is 4×8 and the intra prediction mode is mode −6, or if the block size is 8×4 and the intra prediction mode is mode 72.

14. The method of claim 1, wherein the determining step comprises determining from a [1 2 1] reference sample filter and the Gaussian interpolation filter for the current block if the block size is larger than 32 samples, wherein the alternative interpolation filter is a DCT-IF interpolation filter, and the determining step comprises determining the DCT-IF interpolation filter for the current block if the block size is smaller than or equal to 32 samples.

15. An apparatus for performing video coding, comprising: a computer processor configured for receiving video data; and programming executable on the computer processor for video coding by performing steps comprising:
receiving input data associated with a current block coded or to be coded by intra prediction in a video picture;
determining an intra prediction mode for the current block;
determining reference samples of the current block according to the intra prediction mode of the current block;
determining an intra reference sample filter from a Gaussian interpolation filter and an alternative interpolation filter according to the intra prediction mode and a block size of the current block, wherein the determining between the Gaussian interpolation filter and the alternative interpolation filter is depending on a comparison of a mode difference value calculated by the intra prediction mode with a size-dependent threshold, wherein the size-dependent threshold is determined according to a variable nTbS, and the variable nTbS is defined as Log 2 of a width of the current block plus Log 2 of a height of the current block shifted by one (nTbS=Log 2(width)+Log 2(height)>>1), wherein the size-dependent threshold is set to be equal to 24 for blocks with block sizes smaller than or equal to 32 samples, wherein the mode difference value calculated by the intra prediction mode is a minimum of an absolute mode number difference between the intra prediction mode and a horizontal mode and an absolute mode number difference between the intra prediction mode and a vertical mode;
applying the intra reference sample filter to the reference samples of the current block to generate an intra predictor for the current block; and
encoding or decoding the current block in the video picture based on the intra predictor.

16. A non-transitory computer readable medium storing program instruction causing a processing circuit of an apparatus to perform a video processing method for video data, and the method comprising:
receiving input data associated with a current block coded or to be coded by intra prediction in a video picture;
determining an intra prediction mode for the current block;
determining reference samples of the current block according to the intra prediction mode of the current block;
determining an intra reference sample filter from a Gaussian interpolation filter and an alternative interpolation filter according to the intra prediction mode and a block size of the current block, wherein the determining between the Gaussian interpolation filter and the alternative interpolation filter is depending on a comparison of a mode difference value calculated by the intra prediction mode with a size-dependent threshold, wherein the size-dependent threshold is determined according to a variable nTbS, and the variable nTbS is defined as Log 2 of a width of the current block plus Log 2 of a height of the current block shifted by one (nTbS=Log 2(width)+Log 2(height)>>1), wherein the size-dependent threshold is set to be equal to 24 for blocks with block sizes smaller than or equal to 32 samples, wherein the mode difference value calculated by the intra prediction mode is a minimum of an absolute mode number difference between the intra prediction mode and a horizontal mode and an absolute mode number difference between the intra prediction mode and a vertical mode;
applying the intra reference sample filter to the reference samples of the current block to generate an intra predictor for the current block; and
encoding or decoding the current block in the video picture based on the intra predictor.

17. The apparatus of claim 15, wherein the programming is executable on the computer processor to further perform the step of applying the Gaussian interpolation filter when two conditions are met.

* * * * *